May 31, 1966  C. VAN DER LELY ETAL  3,253,673
ENGINE AND TRANSMISSION CONTROL FOR A VEHICLE
Filed Dec. 1, 1961  9 Sheets-Sheet 1

INVENTORS
C. VAN DER LELY
C. O. JONKERS
F. H. FOCKENS
BY Mason, Mason & Albright
Attorneys

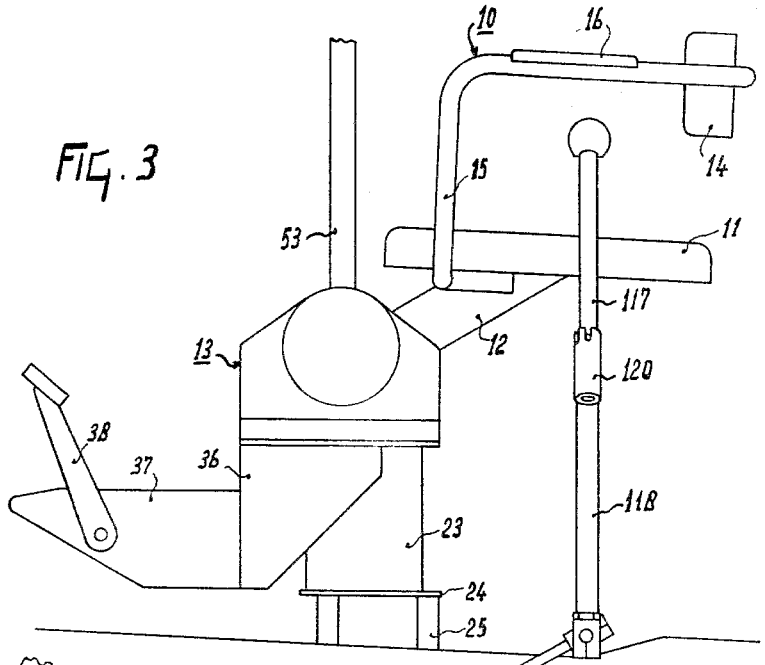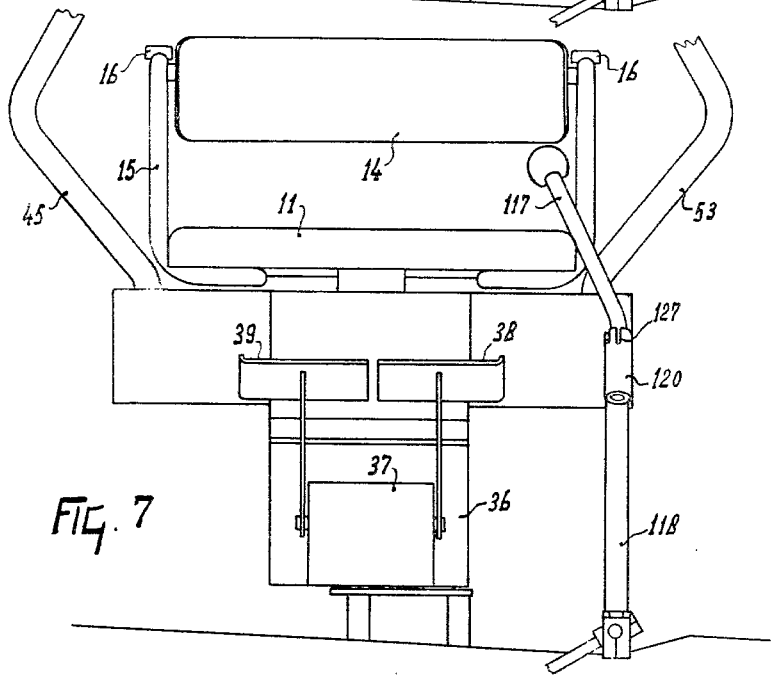

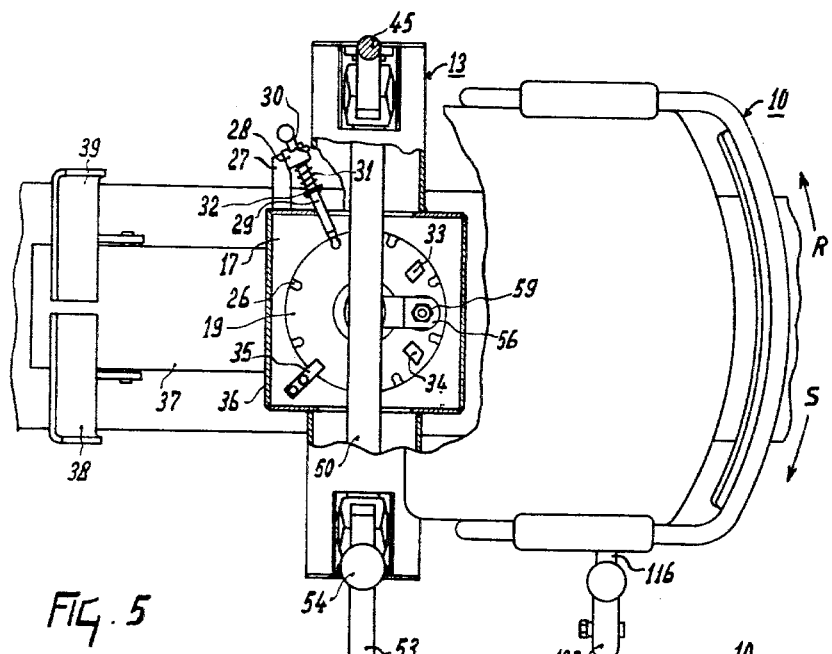
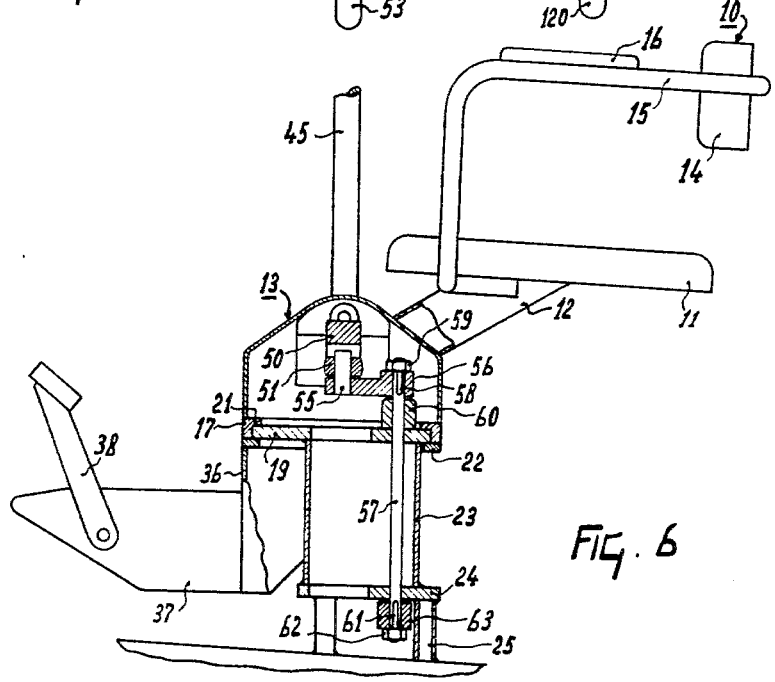

May 31, 1966 C. VAN DER LELY ETAL 3,253,673
ENGINE AND TRANSMISSION CONTROL FOR A VEHICLE
Filed Dec. 1, 1961 9 Sheets-Sheet 6

INVENTORS—
C. VAN DER LELY
C. O. JONKERS
F. H. FOCKENS
BY Mason, Mason & Albright
ATTORNEYS

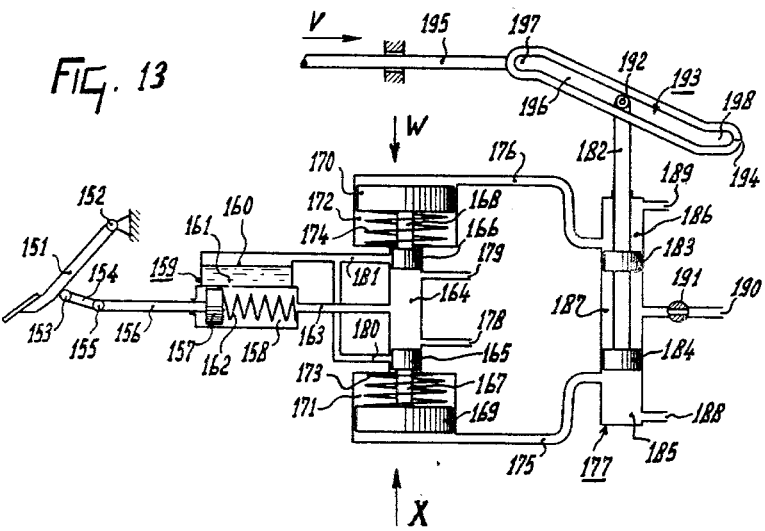

May 31, 1966  C. VAN DER LELY ETAL  3,253,673
ENGINE AND TRANSMISSION CONTROL FOR A VEHICLE
Filed Dec. 1, 1961  9 Sheets-Sheet 8

Fig. 15

INVENTORS—
C. VAN DER LELY
C. O. JONKERS
F. H. FOCKENS
BY Mason, Mason & Albright
Attorneys May 31, 1966   C. VAN DER LELY ETAL   3,253,673
ENGINE AND TRANSMISSION CONTROL FOR A VEHICLE
Filed Dec. 1, 1961   9 Sheets-Sheet 9
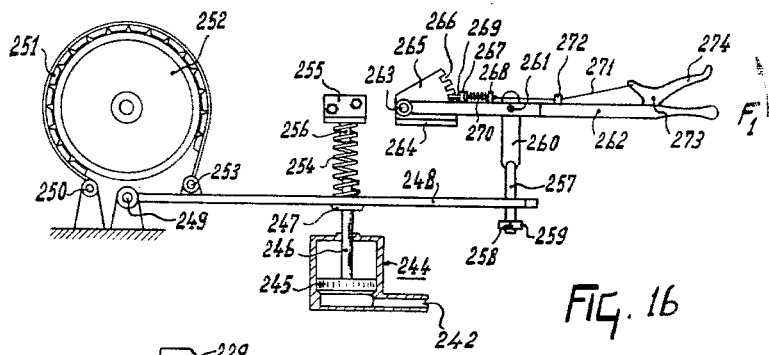
FIG. 16
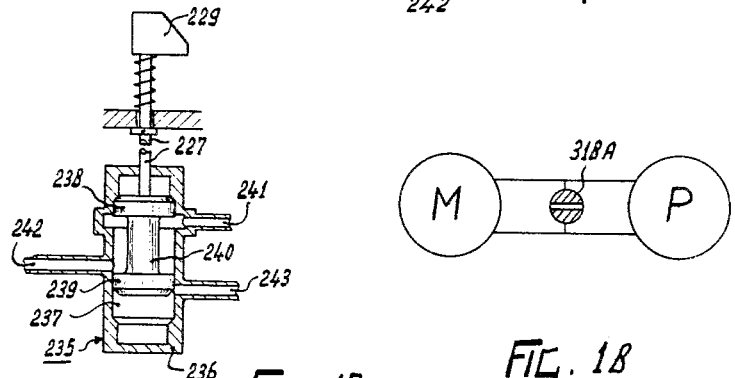
FIG. 17
FIG. 18
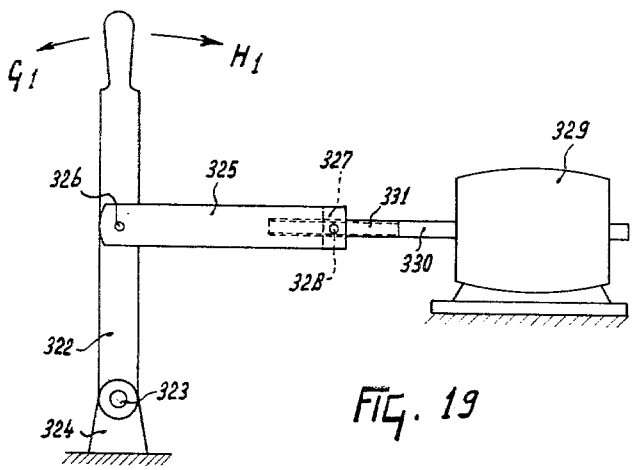
FIG. 19
INVENTORS
C. VAN DER LELY
C. O. JONKERS
F. H. FOCKENS
BY Mason, Mason & Albright
Attorneys United States Patent Office
3,253,673
Patented May 31, 1966

3,253,673
ENGINE AND TRANSMISSION CONTROL
FOR A VEHICLE
Cornelis van der Lely, Zug, Switzerland, and Cornelius
Otto Jonkers, Delft and Foppe Hilbertus Fockens,
Maasland, Netherlands, assignors to C. van der Lely
N.V., Maasland, Netherlands, a Dutch limited-liability
company
Filed Dec. 1, 1961, Ser. No. 156,321
Claims priority, application Netherlands, Dec. 9, 1960,
258,916
23 Claims. (Cl. 180—77)

This invention relates to a vehicle comprising a frame and running wheels supporting this frame.

In accordance with the invention the vehicle comprises an engine, which is linked via a hydraulic transmission system to the driven wheel or wheels of the vehicle, while the transmission ratio of said system is adjustable with the aid of an adjusting member, which is adjustable with respect to the frame and which can be displaced, out of its central position in which the driven wheel or wheels are normally not set rotating by the engine, in a direction which is at an angle to the direction in which the adjusting member for varying the transmission ratio is displaced, the adjusting member actuating a mechanism which acts upon a regulating mechanism or regulator by means of which the speed of revolution of the engine is controlled so that the speed of revolution of the engine is reduced. It can thus be ensured that, when the vehicle is brought to a standstill, the speed of revolution of the engine automatically drops to the stationary speed.

A second aspect of the invention relates to a vehicle comprising a frame and running wheels supporting this frame. In accordance with the invention the vehicle comprises an engine which is linked via a hydraulic transmission system with the wheel or wheels of the vehicle, which are thus set rotating, while the transmission ratio of the transmission system is adjustable by means of an adjusting member, which is adjustable with respect to the frame and which can be displaced, out of a central position in which the driven wheel or wheels are normally not set rotating by the engine, in a direction which is at an angle to the direction in which the control-member for varying the transmission ratio is displaced, said adjusting member actuating a mechanism which brakes at least one of the wheels supporting the vehicle. It can thus be achieved that, when the vehicle is stopped, the wheels of the vehicle are automatically blocked by means of a brake.

A third aspect of the invention relates to a vehicle comprising a frame and running wheels supporting the frame. In accordance with the invention the vehicle comprises an engine which sets rotating wheels of the vehicle via a hydraulic transmission system, while in normal operation high-pressure fluid flows from the engine-driven part of the transmission system to work the wheel-coupled part thereof and low-pressure fluid flows from the wheel-coupled part of the transmission system to the engine-driven part, while at the same time the transmission ratio of the transmission system is adjustable with the aid of an adjusting member adjustable relative to the frame, this member being adapted to be displaced, out of its central position in which the wheels are normally not driven by the engine, in a direction which is at an angle to the direction in which said member for varying the transmission ratio is turned, this adjusting member actuating a mechanism which short-circuits the high-pressure part and the low-pressure part of the transmission. It can thus be avoided that, when the vehicle is stopped with the engine in operation, the wheels of the vehicle are set rotating at an undue instant.

For a better understanding of the invention and in order that the same may be readily carried into effect, reference will now be made to the accompanying drawing.

FIG. 3 shows on an enlarged scale a side elevation of the seat of the tractor shown in FIG. 1.

FIG. 5 shows the seat of the tractor of FIG. 1, viewed from above, partly in a sectional view and partly in an elevation.

FIG. 6 is partly a sectional view and partly an elevation of the seat shown in FIG. 5.

FIG. 7 is an elevation of the seat of the tractor shown in FIG. 1, which seat is turned through 90° in anti-clockwise direction with respect to the position of the seat in FIG. 1.

FIG. 13 shows diagrammatically the arrangement of a hydraulically operating braking mechanism suitable for use in the tractor shown in FIG. 1.

FIG. 14 shows diagrammatically the arrangement of the braking mechanism suitable for use in the tractor of FIG. 1, when the wheels are mechanically braked.

FIG. 15 shows diagrammatically the various control-members by means of which the speed of the tractor and the speed of revolution of the engine can be controlled.

FIG. 16 shows diagrammatically a braking mechanism which becomes automatically operative when the tractor is stopped.

FIG. 17 is a sectional view of a valve by means of which the mechanism shown in FIG. 16 can be actuated.

FIG. 18 shows diagrammatically a hydraulic engine and a hydraulic pump, suitable for use in a transmission system.

FIG. 19 shows diagrammatically the coupling of a lever and an electric motor, suitable for use in a tractor shown in FIG. 1, when the latter is remote-controlled by electric agency.

Figure 1:
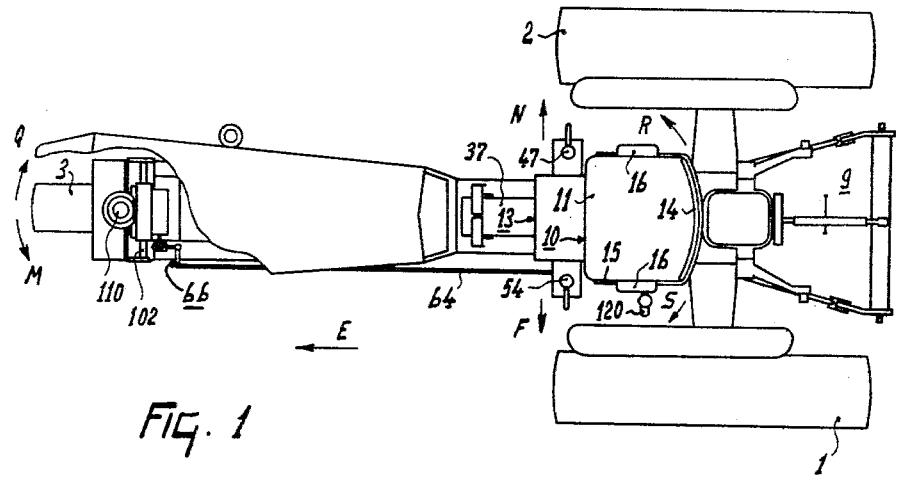
FIG. 1 is a plan view of the tractor according to the invention.
Figure 2:
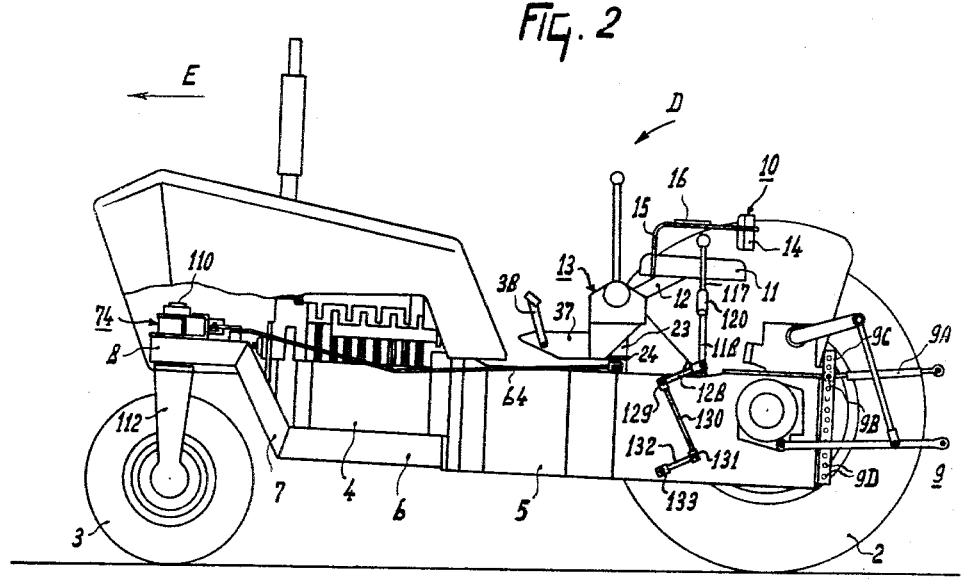
FIG. 2 is a side elevation of the tractor shown in FIG. 1.

The vehicle shown in FIGS. 1 and 2 is a tractor, which comprises a frame, which is supported from two running wheels 1 and 2, arranged on an axle, and, viewed in the longitudinal direction of the tractor, from a steerable ground wheel 3 midway between the said wheels 1 and 2. In the frame is arranged an engine 4, which can be coupled via a transmission system with the driven wheels 2 and 3. The transmission system is arranged in a housing 5, which forms part of the frame. To the housing 5 are secured horizontal frame beams 6, which are connected with beams 8, parallel to the beams 6, with the aid of obliquely ascending beams 7. The foremost running wheel 3 is located below the beams 8. The engine 4 bears on the beams 6, lying each on one side thereof. The bottom side of the engine and the housing of the transmission connecting the engine with the rear wheels are located for a large part underneath the topmost point of the running wheel 3. Thus the tractor has a low-level point of gravity. The engine and the housing of the transmission, which may be formed, if desired, by a well-known and conventional gear box will thus, in general not come into undesirable contact with the crop, when the tractor is used on a field having crop in rows, since the engine and the transmission are in line with the running wheel 3, which rides between the rows of the crop under the operational conditions.

One embodiment of a transmission system suitable for use in this case is shown diagrammatically in FIG. 10 and the operation thereof will be described more fully hereinafter with reference to the said figure.

The tractor is furthermore provided with a hydraulic lifting device 9, which is arranged between the two fixed running wheels 2 and 3. The topmost arm 9A of the lifting device is pivoted by means of a pin 9B to vertical strips 9C, lying one on each side of the arm and secured to the frame. Since the strips 9C have a plurality of holes 9D, lying one above the other, through which the pin 9B can be taken, the lever arm 9A can be coupled with the tractor at different heights.

Figure 4:
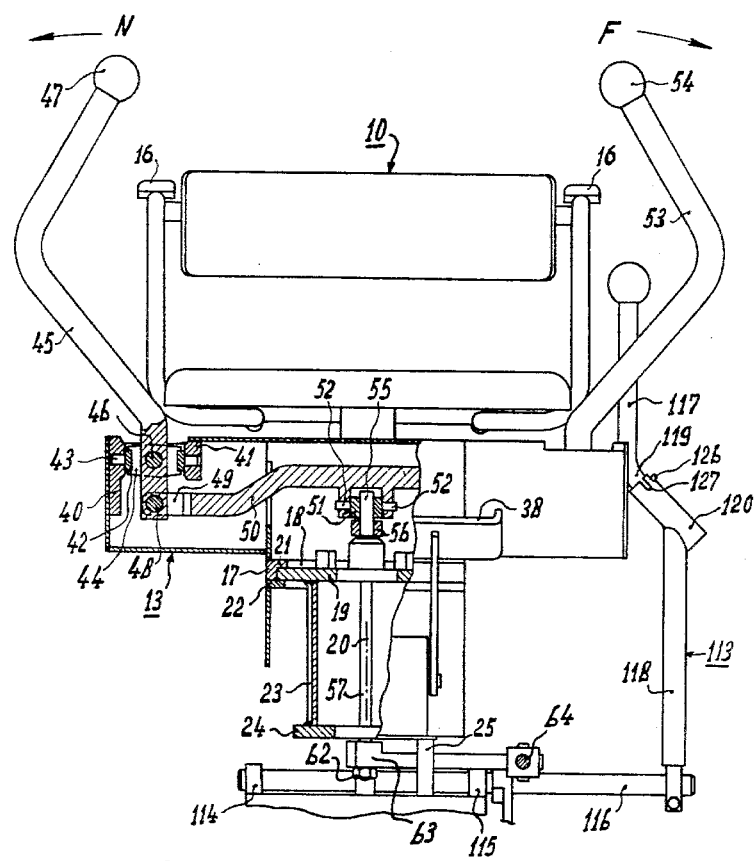
FIG. 4 shows on an enlarged scale the seat with its fastening means of the tractor shown in FIG. 1, partly in a sectional view and partly in an elevation.

The tractor comprises furthermore a seat 10, which is arranged above the transmission. The seat 10 comprises a chair 11, which is fastened to a tube 12, which, in turn, is secured to a housing 13. The seat 10 furthermore comprises a back 14, which is secured to the chair 11 by means of supports 15 on which elbow-rests 16 are provided. On the lower side of the housing 13 provision is made of a plate 17, having a circular hole 18 (FIG. 4). The plate 17 has furthermore a circular recess, the diameter of which is equal to the diameter of a circular plate 19, arranged in this recess, while the center line 20 of the hole 18 coincides with the center line of the plate. The diameter of the hole 18 is, however, smaller than the diameter of the recess provided in the plate 17. Thus a shoulder 21 is formed at the transition between the hole 18 and the recess accommodating the plate 19. The shoulder 21 bears on the flat top face of the plate 19. On the lower side of the plate 17 provision is made of a plate 22, so that the plate 19 is enclosed between the shoulder 21 and the plate 22. Between the shoulder 21 and the plate 22 such a space is left that the housing secured to the plate 17 with the seat 10, secured to this housing, can turn about a vertical axis formed by the center line of the circular plate 19. The plate 19 is secured to one end of a vertical tube 23, whereas the other end of the tube 23 is secured to a plate 24, which bears on supports 25, fastened to the frame.

The side of the plate 19 is provided with radial recesses 26 (FIG. 5). To the housing 13 is secured a support 27, the end of which is provided with a plate having an upright rim 28. Through a hole in the plate secured to the support 27 and through a hole in the plate 17 is taken a locking pin 29, which is provided with a bent-over end 30. The locking pin 29 is surrounded by a spring 31, which is enclosed between the plate secured to the support 27 and a ring 32, secured to the locking pin. The bent-over end 30 of the locking pin 29 and the spring 31 are located on different sides of the plate through which the locking pin is taken. A turn of the housing 13 with the seat 10, secured thereto, can be avoided by inserting the locking pin into one of the recesses 26. The upright rim 28 constitutes a stop for the bent-over end of the locking pin 29. The plate 19 is furthermore provided with two cams 33 and 34 and the plate 17, secured to the housing 13, is provided with a cam 35.

The plate 22 is provided with a connecting piece 36, which is provided with a foot support 37. To the foot support 37 are coupled foot pedals 38 and 39, by means of which given members of the tractor can be controlled.

In the housing 13 are arranged bearings 40 and 41, in which stub shafts 43, secured to a connecting element 42, are journalled (FIG. 4). The pivotal connecting element 42 is provided with a hole 44, through which a steering column formed by a lever 45 is taken. The lever 45 is pivoted to the element 42 by means of a shaft 46. The center line of the shaft 46 intersects the center lines of the aligned stub shafts 43 at right angles. The element 52 with the stub shafts 43 and the shaft 46 constitutes a universal joint, with the aid of which the lever is coupled with the seat so that the lever is adapted to turn about two orthogonal shafts with respect to the seat. One end of the lever 45 is provided with a knob 47, which is located within the reach of a person sitting on the seat 10. The other end of the lever is pivoted with the aid of a shaft 48, extending parallel to the shaft 46, to the fork-shaped end 49 of a connecting member 50. To the connecting member 50 is pivoted a coupling member 51 with the aid of stub shaft 52. The center lines of the stub shafts 52 are at right angles to the center line of the shaft 48.

A second steering column, formed by a lever 53, which is provided at one end with a knob 54, is coupled with the housing 13, similarly to the lever 45, and is connected with the connecting member 50.

The coupling member 51 has a hole for accommodating a vertical pin 55 so that the coupling member 51 is freely rotatable about the pin 55 and is slidable along this pin. The pin 55 is rigidly secured to an arm 56, which is secured to a vertical shaft 57 with the aid of a wedge 58 and a nut 59 (FIG. 6). The vertical shaft 57 is supported from a bearing 60, secured to the plate 19 and is taken through a hole in the plate 19 and a hole in the plate 24. With the aid of a wedge 61 and a nut 62, the portion of the vertical shaft 57, extending below the plate 24, has secured to it an arm 63, which is at right angles to the arm 56 (see also the diagram shown in FIG. 12).

To the arm 63 is pivoted one end of a coupling rod 64. The other end of the coupling rod 64 is pivoted to an arm 65 of an angle lever 66. The angle lever 66 is hinged to a support 67, rigidly secured to the frame. To a second arm 68 of the angle lever 66 is secured a plate 69, which is provided with an elongated slot 70. In this slot 70 is accommodated a pin 71, which is coupled with a control-rod 72 of a hydraulic steering excitation gear. The hydraulic steering excitation gear is shown in a sectional view in FIG. 11.

Figure 11:
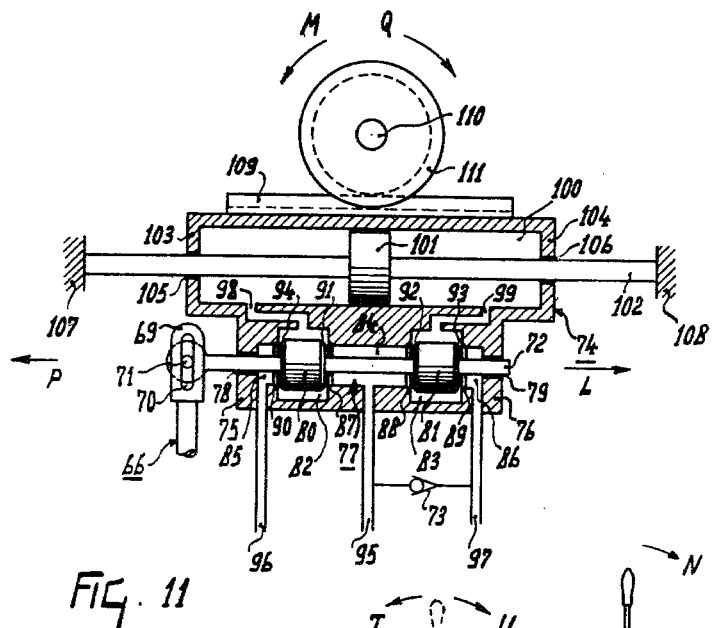
FIG. 11 is a sectional view of the hydraulic energizing member of the steering mechanism.

From FIG. 11 it appears that the control-rod 72 is journalled in holes 78 and 79 in the walls 75 and 76 of a chamber 77, forming part of the housing 74 of the steering excitation gear. To the control-rod 72 are secured piston-like bodies 80 and 81. The chamber 77 comprises two parts 82 and 83, in which the piston-like bodies 80 and 81 are arranged, and a cylindrical portion 84, connecting the spaces 82 and 83 with each other and having a smaller diameter than the spaces 82 and 83. The remote sides of the spaces 82 and 83 communicate with the cylindrical spaces 85 and 86, which have the same diameter as the space 84. The transitions between the spaces 82 and 83 and the spaces 84, 85 and 86 constitute seats 87 to 90, which are shaped in the same form as the sides 91 to 94 of the piston-like bodies 80 and 81. With the space 84 communicates a duct 95, with the space 85 a duct 96 and with the space 86 a duct 97. The duct 97 communicates via a check valve 73 with the duct 95. The spaces 82 and 83 communicate via channels 98 and 99 with a cylindrical space 100 in the housing 74, in which space is accommodated a piston 101. The two channels open out each on one side of the piston 101 in the space 100. The piston 101 is fastened to a rod 102, which is taken through holes 105 and 106 in walls 103 and 104 of the cylindrical space 100. The ends of the piston rod 102 are secured to supports 107 and 108, lying each on one side of the housing 74 and rigidly secured to the frame of the tractor.

To the housing 74 is furthermore secured a toothed rack 109, which co-operates with a gear wheel 111, secured to a vertical shaft 110. The shaft 110 is freely rotatable in a bearing, secured to the frame. To the shaft 110 is secured a support 112, with which the running wheel 3 is coupled (FIG. 2).

Figure 9:
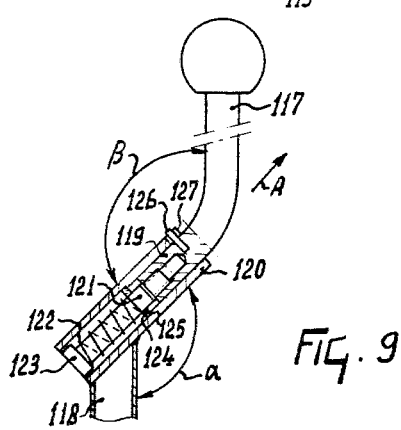
FIG. 9 is a sectional view, on an enlarged scale, of the connection of the two parts of a control-lever of the tractor.

The tractor is furthermore provided with a control-lever 113, which is secured to a shaft 116, extending transversely to the longitudinal direction of the tractor and freely rotatable in bearings 114 and 115, secured to the frame (FIG. 4). The control-lever 113 comprises two relatively rotatable portions 117 and 118. The portion 117 has a bent-over end 119, which is journalled in a sleeve 120, secured to the portion 118 (see FIG. 9). The center line of the sleeve is at an angle $\alpha$ to the center line of the portion 118. Ths angle $\alpha$ is in this embodiment about 135°. The angle $\beta$ between the bent-over end 119 and the further part of the portion 117 is equal to the angle $\alpha$. Into the end 119 of the portion 117 screwed into the sleeve 120 is taken a bolt 121. The bolt 121 is surrounded by a spring 122, one end of which bears on the head 123 of the bolt 121 and the other end of which bears on a ring 124, provided in the sleeve 120. The ring 124 bears on a collar 125, provided in the sleeve 120. Into the portion 117 is inserted a pin 126, which is accommodated in one of the recesses 127, provided in the side wall of the sleeve 120. The portion 117 can be displaced in the sleeve 120 against the pressure of the spring 122 to an extent such in the direction of the arrow A that the pin 126 is withdrawn from a recess 127. Then the portion 117 is adapted to turn about the center line of the sleeve 120 and the pin 126 can be inserted into a further recess 127, so that the positions of the portions 117 and 118 relative to each other are changed.

To the shaft 116 is secured one end of an arm 128 (see FIG. 2). To the other end of this arm is pivoted, by means of a pin 129, a coupling rod 130, the other end of which is pivoted to an arm 132 with the aid of a pin 131, which arm is rigidly secured to a shaft 133. The shaft 133 is coupled with the transmission system.

Figure 10:
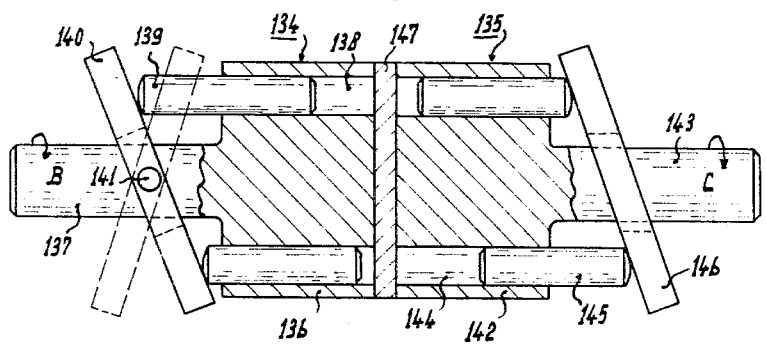
FIG. 10 shows diagrammatically a transmission system suitable for use in the tractor shown in FIG. 1.

The transmission system, fully disclosed in U.S. Patent 3,132,486, is only shown diagrammatically in FIG. 10, comprises a hydraulic pump 134 and a hydraulic engine 135. The pump 134 comprises a housing 136, which is secured to a shaft 137. The housing has axial bores 138, in which plungers 139 are adapted to reciprocate. The plungers 139 bear at one end on a rocking plate 140, which is secured to a shaft 141, with which shaft it is adapted to turn about the center line of the shaft 137. The engine 135 has a housing 142, which is secured to a shaft 143. The housing 142 has axial bores 144, in which plungers 145 are adapted to reciprocate. The plungers 145 bear at one end on a rocking plate 146, which is arranged so that the plane going through the ends of the plungers bearing on the plate 146 is at an angle to the center line of the shafts 143 of less than 90°. The housing 136 of the pump and the housing 142 of the engine are separated from each other by a steering plate 147, which is provided with elongated slots (not shown). The shaft 137, fastened to the housing 136 of the pump, can be coupled with the engine 4, whereas the shaft 143, fastened to the housing 142 of the engine can be coupled with the driven wheels 1 and 2. The shaft 141, to which the rocking plate 140 is secured, is coupled with the shaft 133 so that a turn of the shaft 133 involves a turn of the rocking plate 140.

The transmission system operates as follows.

The rocking plate 140 can be moved by a turn of the shaft 141 into a position in which the face of the rocking plate on which bear the ends of the plungers is at right angles to the center line of the shaft 137. If the housing 136, fastened to the shaft 137, is set rotating by the engine 4, the plungers 139 will not be displaced in the holes 138. If, however, the rocking plate 140 is turned, for example into the position shown in full lines, a number of the plungers 139 will perform a movement towards the steering plate 147, so that they displace the fluid available in the spaces. This fluid is urged through a slot in the steering plate 147 towards the engine 135. This fluid will displace in an axial direction a number of the plungers 145 in the housing 142 of the engine 135 away from the steering plate, so that the ends of the plungers slide along the plate 146 and the housing 142 of the engine is set rotating. A number of the engine plungers will thus move in an axial direction towards the steering plate and the fluid displaced by these plungers flow through a second slot in the steering plate back to the pump.

When the housing of the pump is driven in the direction of the arrow B and when the rocking plate 140 occupies the position shown in full lines, the housing of the engine will rotate in the direction of the arrow C. A variation in the position of the rocking plate 140 of the pump results, with a constant speed of revolution of the pump, in a variation in the speed of the driven engine. If the control-member of the pump is moved into the position shown in broken lines, the engine will rotate in a direction opposite the arrow C, when the pump rotates in the same direction. Also in this case a variation of the position of the rocking plate 140 of the pump, with a constant speed of revolution of the pump 134, results in a variation in the speed of revolution of the engine 135.

The parts of the tractor described above are actuated and operate as follows.

It will be assumed that the various parts, for example the driver's seat and the lever 113, occupy the positions shown in FIGS. 1 to 6, while the engine 4 drives the housing 136 of the pump 134 of the gear box in the direction of the arrow B. By turning the lever 113 out of the central position in the direction of the arrow D (FIG. 2), the control-member 140, coupled with the lever, and associated with the pump 134 is displaced so that also the engine 135 of the gear change starts rotating and the wheels 1 and 2, coupled with the engine, are set rotating. The coupling of the various parts of the transmission and the driven wheels is preferably such that the tractor moves in the direction of the arrow E (FIG. 1). By turning the lever 113 further in the direction of the arrow D, the angle between the control-member 140 and the axis of rotation of the housing 136 of the pump 134 will increase. As a result the quantity of fluid displaced per revolution by the plungers increases, so that the speed of revolution of the engine 135 increases and hence the speed of the tractor. As a matter of course, the speed may also be controlled by varying the speed of the engine 4. When the lever 113 is turned out of the central position in a direction opposite the arrow D, the tractor will move in a direction opposite the arrow E. In this arrangement the travelling direction corresponds with the direction in which the lever 113 is moved. The lever 113 is located well within the reach of a person on the seat 10, so that its actuation does not involve any difficulty.

Owing to the transmission system described above, the tractor is capable of riding both in the direction of the arrow E and in the opposite direction with the same speed. It is capable of exerting in both directions the same tractive power. The speed can furthermore be controlled continuously.

The person on the seat can steer the tractor with the aid of levers 45 and/or 53. If the lever 45 and the lever 53, coupled with the former, are turned in the direction of the arrow F about the shafts 46, the connecting member 50 will move in the direction of the arrow G (see FIG. 12). Thus the arm 56, coupled with the connecting member 50 by means of the pin 55, will turn in the direction of the arrow H. The coupling member 51 slides along the pin 55. This turn results in a turn of the arm 63, connected rigidly with the arm 56, in the same direction. The coupling rod 65, coupled with the arm 64, will thus move in the direction of the arrow J, so that the angle lever 66 turns in the direction of the arrow K. This involves a displacement of the rod 72 with the piston-like bodies 80 and 81, connected herewith, in the direction of the arrow L.

Fluid under pressure is fed to the steering exciter via the duct 95, which opens out in the space 84. In the position of the steering exciter shown in FIG. 11 this fluid can flow freely away through the ducts 96 and 97, which communicate with the spaces 85 and 86. However, if the rod 72 is displaced in the direction of the arrow L, the piston-like bodies 80 and 81 will bear on the seats 87 and 89, so that the communication between the duct 95 and the reflow ducts 96 and 97 is closed. The fluid supplied through the duct 95 can thus flow only through the channel 99 into the space 100. Consequently, fluid under pressure is fed to the right-hand side of the piston 101, whereas the fluid on the other side can flow freely away through the channel 98, the spaces 82 and 85 and the duct 96. Under the action of the fluid pressure the housing 74 of the steering mechanism with the toothed rack 109, secured thereto, will also move in the direction of the arrow L. This results in a turn of the pinion 111 and of the steering wheel 2, connected with the pinion, in the direction of the arrow M.

If the levers 45 and 53 are not turned further, after a given position has been reached, the piston-like bodies 80 and 81 are disengaged from the seats 87 and 89, so that the ducts 95, 96 and 97 are again in open communication with each other and the housing will not slide further.

If the levers 45 and 53 are turned in the direction of the arrow N, the rod 72 with the piston-like bodies 80 and 81, secured thereto, is displaced in the direction of the arrow P. The piston-like bodies 80 and 81 are urged against the seats 88 and 90 and the fluid under pressure can flow only through the duct 98 to the cylindrical space 100. The housing 74 of the hydraulic steering mechanism will then also move in the direction of the arrow P, so that the pinion 111 and the steering wheel 3, secured thereto will turn in the direction of the arrow Q.

If no fluid under pressure is supplied, the housing of the hydraulic steering mechanism can yet be displaced, since with a displacement of the rod 72, the housing 74 is moved along by the piston-like bodies 80 and 81, when the latter come into contact with the seats. In order to prevent a subpressure in part of the space 100, the duct 95 communicates with the duct 97 via a check valve 73, so that fluid can flow from the duct 97 to the duct 95, but not in a reverse direction.

Figure 8:
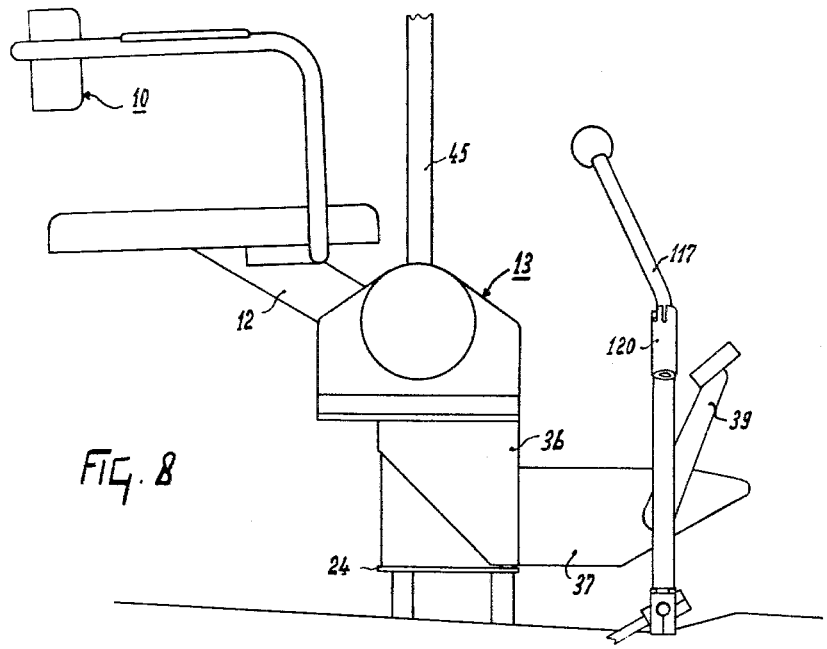
FIG. 8 shows the seat in a position turned through 180° with respect to the position of the seat shown in FIG. 1.

From the foregoing it will be obvious that, viewed in the travelling direction, when the steering levers are moved to the left, the tractor describes a bend to the left, and with a movement of the steering levers to the right, the tractor will ride through a right-hand bend. When, in operation, the tractor rides in a direction opposite the arrow E, the seat can be turned through an angle of, for example, 180° in order to have a satisfactory view in the new travelling direction. To this end the locking pin 29 is turned about its center line with the aid of the bent-over part 30. The bent-over part 30 of the locking pin glides along the upright rim 28, which is shaped in a form such that a movement of the part 30 along this rim results in an axial movement of the pin 29, against the pressure of the spring 31, so that the locking pin is withdrawn from the recess 26 of the plate 19. Then the seat can be turned in the direction of the arrow R (FIG. 5) until the cam 33, secured to the plate 19 and constituting a stop, comes into contact with the cam 35, secured to the plate 17 and constituting a stop. In this new position of the seat the locking pin 29 can be inserted again into one of the recesses 26, so that the seat is locked against rotation. During the turn of the seat the connecting member 50 with the coupling member 51 turns about the pin 55, the center line of which coincides, in the central position of the steering mechanism, with the rotary axis 20 of the seat. This turned position of the seat is shown in FIG. 8.

In order to insure that the control member 113 is located within the reach of the driver also in the new position of the seat, the part 117 is turned with respect to the part 118, so that the end of the control member lies again within the driver's reach. In the new position of the seat, the lever 53 is located at the place of the lever 45 and the lever 45 at the place of the lever 53 (see the diagram of FIG. 12).

It will be obvious that also in this case a turn of the levers in the direction of the arrow F results in a turn of the steering wheel in the direction of the arrow M (FIG. 1). A turn of the levers 45 and 53 in the direction of the arrow F means, viewed in the new travelling direction of the tractor, a right-hand turn, whereas a turn of the steering wheel in the direction of the arrow M causes the tractor to describe a right-hand bend, in the new travelling direction. A turn of the levers 45 and 53 in the direction of the arrow N, i.e. viewed in the new travelling direction of the tractor opposite the arrow E a left-hand turn, results in a turn of the steering wheel in the direction of the arrow Q. The tractor then describes a left-hand bend. Also in the new position of the seat a turn of the levers also with respect to the longitudinal axis of the tractor to the right results in a right-hand bend, whereas a turn of the levers to the left with respect to the longitudinal axis of the tractor results in a left-hand bend. Also in this case errors in steering are therefore practically excluded.

The seat may be fixed also in other positions relative to the tractor, for instance in the position in which the seat is turned, with respect to the position shown in FIG. 1, through 90° in the direction of the arrow R or through 90° in the direction of the arrow S. The first-mentioned position of the seat is shown in FIG. 7. The part 117 of the control-lever 113 of the gear change is also in this case adapted to turn with respect to the part 118 so that the end of the part 117 is located within the reach of the driver on the seat, which appears from the figures. In the aforesaid positions of the seat, when the steering mechanism is in its central position, so that the steerable wheel is in the position shown in FIGS. 1 and 2, the connecting member 50 extends parallel to and above the arm 56. The arm 56 can be turned by means of the levers 45 and 53 with the shaft 57, by turning the levers 45 and 53 about the centre lines of the stub shafts 43. In the position of the seat shown in FIG. 7 or in a position turned through 180° with respect to the former this also means a movement at right angles to the longitudinal axis of the tractor.

Figure 12:
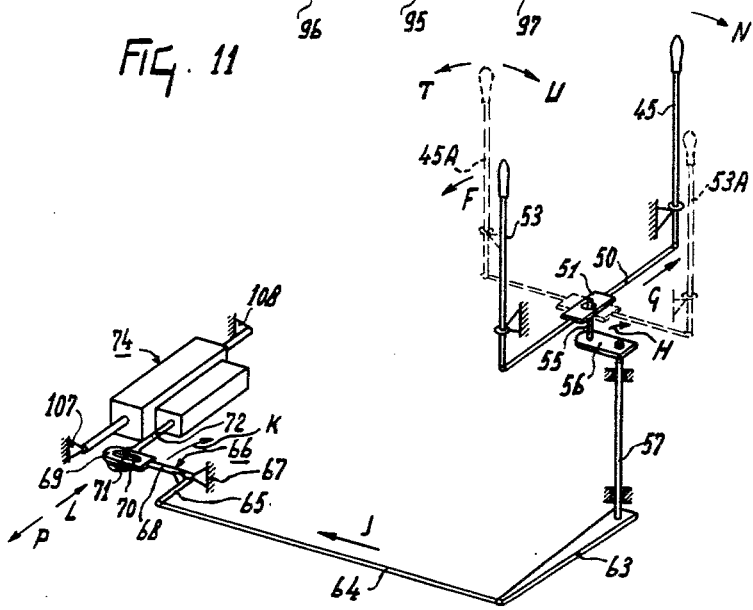
FIG. 12 shows diagrammatically the arrangement of the steering mechanism.

The positions of the levers, when the seat is arranged as is shown in FIG. 7, are shown in broken lines in the diagram of FIG. 12, in which the reference numeral of the lever 45 is changed into 45A and that of the lever 53 into 53A. If the levers 45 and 53 are turned in the direction of the arrow T, the arm 56 will turn in the direction of the arrow H and the steering wheel 3 in the direction of the arrow M. If the levers are, however, turned in the direction of the arrow U, the lever 56 will turn in the direction opposite the arrow H and the steering wheel 3 will turn in the direction of the arrow Q. It will be obvious that also in the position of the seat shown in FIG. 7, the tractor describes a bend in the directions in which the levers are displaced. If the seat is moved into a position turned through 180° relative to the position shown in FIG. 7, the levers with the coupling member are turned about the pin 55 so that the lever 45 is located at the place of the lever 53A, shown in FIG. 12 and the lever 53 is located at the place of the lever 45A. Also in the new position the levers can be turned in the direction of the arrow T or the arrow U, while the steering wheel will again turn in the direction of the arrow M and Q, respectively, so that also in this position of the seat the tractor will ride in a direction corresponding with the direction in which the levers are turned with respect to the longitudinal direction of the tractor. It will be obvious that the seat can also be moved into different positions intermediate between the aforesaid positions; steering being yet possible owing to the pivotal connection between the levers 45 and 53 and the connecting member 50 and the pivotal joint between the connecting member 50 and the coupling member 51 and the pin 55.

FIG. 13 shows diagrammatically a mechanism which permits of braking by both wheels, in normal operation, while in riding through a sharp bend, one wheel, i.e. the wheel lying on the inner side of the bend, is braked more strongly than the wheel lying on the outer side of the turn. The mechanism is actuated by means of a brake pedal 151, which is coupled with the frame of the tractor so as to be pivotable about a shaft 152. With the aid of a shaft 153 a coupling rod 154 is pivoted to the brake pedal 151. The coupling rod 154 is pivoted with the aid of a shaft 155 to a piston rod 156. To the end of the piston rod 156 is secured a piston 157, which is housed in a cylindrical space 158, which forms part of a main brake cylinder 159. The main brake cylinder comprises furthermore a container 160, which communicates through a hole 161 with the space 158. The space 158 comprises furthermore a spring 162, one end of which bears on the wall of the space 158 and the other end of which bears on the piston 157, which is thus held in the position shown, while the container 160 is in open communication via the hole 161 with the space 158. The space 158 communicates via a channel 163 with a cylindrical space 164. The latter space comprises two members formed by piston-like bodies 165 and 166. The pistons 165 and 166 are connected by means of coupling rods 167 and 168, respectively, with piston-like bodies 169 and 170, respectively, which have a considerably larger diameter than the piston-like bodies 165 and 166. The piston-like bodies 169 and 170 are located in cylinders 171 and 172. The coupling rods 167 and 168 are surrounded by springs 173 and 174, respectively, which tend to hold the piston-like bodies in the positions shown. The cylinders 171 and 172 communicates one the sides of the pistons 169 and 170 remote from the pistons 165 and 166, via ducts 175 and 176 with a cylindrical space of a control-member 177. With the cylindrical housing 164 are connected two ducts 178 and 179, each of which is connected with a braking cylinder of a known hydraulic braking mechanism of one of the wheels 1 and 2. With the spaces 164 communicate channels 180 and 181, which are closed by the pistons 165 and 166 in their positions shown (FIG. 13). The channels 180 and 181 are in open communication with the supply vessel 160.

In the cylindrical housing of the control-member 177 are arranged two pistons 183 and 184, connected with a piston rod 182. The pistons 183 and 184 divide the cylindrical space of the control-member 177 into three portions 185, 186 and 187. With the portion 185 communicates the duct 175 and a duct 188, whereas the portion 186 communicates with the duct 176 and a duct 189. The portion 187 communicates with a duct 190, which includes a cock 191.

To the end of the piston rod 182, projecting beyond the cylinder 177, is secured a pin 192, which is located in an elongated slot 193, forming a guide for the pin or cam 192 and provided in a coupling member 194. The coupling member 194 is secured to a coupling rod 195, which is displaceable in its longitudinal direction. The slot 193 has a portion 196, which is at an angle to the longitudinal direction of the coupling rod 195 and which links two portions 197 and 198 of the slot, which portions are parallel to the longitudinal direction of the coupling rod 195.

Via the duct 190 fluid is fed under pressure from a pump (not shown) driven by the engine 4 to the space 187. When the steering levers occupy their central positions, the piston rod 182 with the piston-like bodies 183 and 184, secured to the shaft, will occupy the position shown in FIG. 13. When the piston 157 is displaced to the right with the aid of the brake pedal, the hole 161 is closed by the piston and the fluid in the space 158 is pressed through the duct 163, the cylinder 164 and the ducts 178 and 179 towards the brake cylinders of the two wheels 1 and 2, so that the two wheels are braked.

When a steering movement is performed by means of the levers 45 and 53, the rod 195, coupled with the steering mechanism is displaced in its longitudinal direction. This results furthermore in a displacement of the rod 182, while the piston-like bodies 183 and 184 are displaced in the cylinder 177. With a large deflection of the levers, which results in a large turn of the steering wheel 3 about the prependicular axis, the rod 195 is displaced over such a distance that the pin 192 arrives into one of the portions 197 and 198, in accordance with the direction in which the rod 195 is displaced. When the rod 195 is displaced in the direction of the arrow V, the pin arrives into the slot portion 197, so that the rod 182 with the piston-like bodies 183 and 184, secured thereto is displaced to an extent such that the piston-like body 183 is located in the cylinder 177 between the ducts 176 and 189. The duct 190, through which the fluid under pressure is fed is thus short-circuit with the duct 176, so that the fluid under pressure can flow towards the cylinder 172 and the piston 170 with the piston 166, secured thereto, is displaced in the direction of the arrow W. The piston 166 arrives between the channel 179 and the opening of the duct 163 in the space 164. When the piston 157 is displaced, fluid can be pressed only via the duct 178 to one of that brake cylinders of one of the wheels 1 or 2, so that only the wheel concerned is braked. The rod 195 is preferably coupled with the steering mechanism so that the wheel lying on the inner side of the bend to be described by the tractor.

It will be obvious that, when the rod 195 is displaced in the direction opposite the arrow V, the pin 192 will arrive, in the case of a large steering deflection, into the portion 198 of the elongated slot 193; the piston 184 then being displaced to an extent such that the duct 190 and the duct 175 are short-circuit with each other. Then the piston 169 with the piston 165, secured thereto, will be displaced in the direction of the arrow X, so that the piston 165 arrives between the opening of the duct 178 and the opening of the duct 163 in the space 164. In this case fluid can flow only through the duct 179 by means of the piston 157, towards the brake cylinder communicating with the duct 179 and associated with the wheel 1 or 2.

When the mechanism described above is moved into a position in which the ducts are closed only partly, the wheel, of which the ducts connected with the braking mechanism are partly closed will be braked to a smaller extent than the other wheel.

When the piston rod 182 is again moved into the position shown in FIG. 13, the fluid of the cylinder 172 or 171 can flow away via the ducts 188 or 189, respectively. Since the piston 165 or 166 is located, after its displacement, between the ducts 178 and 163, and 179 and 163 respectively, the ducts 178 and 179, respectively, are in open communication with the container 160, so that no pressure will prevail in these ducts.

The mechanism described above simplifies maneuvering on the field.

In order to avoid difficulties in describing a sharp bend with a fairly high speed, for example in driving on the road, the duct 190 can be closed with the aid of the clock 191. It is thus avoided that, when braking in a bend, only one wheel is braked, which might be dangerous when driving at high speed.

FIG. 14 shows diagrammatically the arrangement of the coupling of the steering mechanism with the braking mechanism of the two rear wheels 1 and 2 for the case in which the brakes of the wheels 1 and 2 are actuated mechanically.

In this embodiment provision is made of a brake pedal 199, which is adapted to turn about a shaft 200, secured to the frame. With the aid of a spring 201, one end of which is coupled with the brake pedal and the other end of which is rigidly secured to the frame, the brake pedal is held in a given position. The brake pedal is coupled with the aid of shaft 202 with a coupling rod 203, which, in turn, is pivoted to a coupling member 205, secured to a rod 204, with the aid of a pin 206. The rod 204 is displaceable in bearings 207 and 208, while at one end of the rod 204 a coupling rod 210 is coupled with the aid of a pin 209, with the steering mechanism. The bearings 207 and 208 are hinged by means of pins 211 and 212 to draw rods 213 and 214, respectively. The other ends of the draw rods 213 and 214 are coupled with levers 215 and 216, respectively, which actuate in known manner the shoe brakes of the wheels 1 and 2. Apart from the connection with the bearings the draw rods are journalled in bearings 217 and 218, respectively, coupled with the frame. By displacing the rod 204 with the aid of steering device, the coupling member 205 can be brought nearer the bearing 207 or the bearing 208. Thus the magnitude of the braking force can be varied. The coupling rod 210 is preferably connected with the steering mechanism so that the coupling member is located, in the central position of the steering mechanism, midway between the bearings 207 and 208, while, when the steering mechanism is displaced, it moves towards the wheel lying on the inner side of the bend described.

FIG. 15 shows diagrammatically the arrangement of the various control-members, which may be successfully employed in the tractor described above.

In this embodiment a control-lever or adjusting member 219 is pivoted with the aid of a pin 220, which is at right angles to the longitudinal axis of the control-lever, to a U-shaped bracket 221, which is secured to the end of a shaft 222. The shaft 222 is journalled in a bearing 223, fastened to the frame of the tractor, so that the shaft is adapted to turn about its longitudinal axis, but not to shift in the bearing. The shaft 222 is connected with a transmission system to shaft 141 in the same way as described above for the shaft 116, so that a turn of the rod 222 about its longitudinal axis results in a variation of the position of the control-member of the transmission. For instance moving member 219 in slot 320 results in biasing plate 140 as seen in full lines in FIG. 10. The end 224 of the control-lever 219 is bent over and has secured to it a gliding member 225. In a plate 226, secured to the frame, are journalled two vertical shafts 227 and 228, to the ends of which are secured cams 229 and 230 respectively. The cams are formed by flat discs, which engage each other and are provided on one side with a sloping edge 231 and 232 respectively. The slope of the edge 231 of the cam 229 is steeper than the slope of the edge 232 of the cam 230. Between the cams and the plate 226 provision is made of springs 233, which tend to hold the cams in the positions shown in the figure. A further movement of the cams in upward direction is prevented by rings 234, provided on the shafts on the lower side of the plate 226.

When the construction shown in FIGURE 15 is used in a tractor shown in FIGURES 1-9, the control lever 113 and 116 are replaced by the control lever 219 and shaft 222, respectively. The rotation of shaft 222 affects the transmission the same as rotation of shaft 116.

From FIG. 17 it will be seen that the cam 229 is connected with the aid of the rod 227 with a valve 235. The valve 235 comprises a box 236, in which a cylindrical space 237 is provided. The space 237 is divided into three portions by means of two pistons 238 and 239, which are connected with each other by an intermediate piece 240. The piston 238 is secured to the rod 227, which is taken through a hole provided in the wall of the box 236. With the box of the valve communicate three ducts 241, 242 and 243. The duct 241 communicates with a container, from where fluid under pressure is fed to the valve box 235. The duct 243 is in communication with a supply vessel for the fluid. The duct 242 communicates with a valve box 244 (see FIG. 16). The valve box 244 comprises a piston 245, to which a rod 246 is secured. The rod 246 is taken through an opening provided in the box and a ring 247 is secured to the rod portion projecting outside the box. The end of the rod 246 is taken through a hole provided in a lever 248, so that the lever bears on the ring 247. The lever 248 is hinged with the aid of a shaft 249 to the frame. At a given distance from the shaft 249, the end of a brake strap 251 is pivoted to the frame with the aid of a shaft 250. The brake strap 251 is wound around a brake drum 252 and the other end of the brake strap is hinged to the lever 248 with the aid of a shaft 253. A spring 254 bears on the lever on the side thereof remote from the valve box 244. The spring 254 is enclosed between the lever 248 and a support 255, secured to the frame of the tractor. The spring is secured against lateral displacement, since one end of the spring surrounds the end of the rod 246, whereas the other end of the spring surrounds a cam 256, secured to the support 255. The free end of the lever 248 is provided with an elongated slot, through which a rod 257 is taken. To the end of the rod 257 is secured with the aid of a pin 258 a ring 259. The other end of the rod 257 is secured to a plate 260, which is pivoted to a lever 262 with the aid of a pin 261. The lever 262 is rotatably connected with a support 264, secured to the frame, by means of a shaft 263. The support 264 comprises a sector-shaped plate 265, provided with recesses 266. To the lever 262 are secured two supports 267 and 268, provided with holes. The supports 267 and 268 accommodate a pin 269, which is urged against the sector-shaped plate 265 by means of a spring 270, lying between the supports 267 and 268. To the pin 269 is secured a cable 271, which is guided through an eyelet 272, secured to the lever 262, one end of this cable being secured to a handle 274, pivoted with the aid of a pin 273 to the lever. If the pin 269 is moved into one of the recesses 266 of the sector-shaped plate, the lever 262 is secured against rotation about the shaft 263.

The rod 228 bears with its end on the flat end 275 of the rod 276 (FIG. 15). The rod 276 forms part of an angle lever 277, which is freely rotatable about a shaft 278, secured to the frame. Against lateral displacement on the shaft 278 the angle lever is secured by its enclosure between a thickened part 279 of the shaft and a ring 280, secured to the shaft. The angle lever comprises furthermore a rod 281, the end 282 of which is provided with an elongated slot 283. through the slot 283 is taken the end of a rod 284 and on each side of the flat end 283 rings 285 are secured to the rod 284. The rod 284 is journalled in bearings 286, secured to the frame. In the position shown in FIG. 15 the other end of the rod 284 is located at a given distance from the arm 287, which is secured to a shaft 288. The shaft 288 is freely rotatable in bearings 289, secured to the frame. The shaft has furthermore coupled with it an arm 290, which is secured to a sleeve 291, which is freely rotatable about the shaft 288. The arm 290 is provided with a slot, through which a rod 292 is taken. The rod 292 is linked to the arm 287 with the aid of a connecting member 293. On one side of the arm 290 the rod 292 has secured to it a ring 294. On the other side of the arm 290 the rod 292 is provided with a ring 295, which is adapted to slide freely along the rod, whereas at the end of the rod a ring 296 is rigidly secured. Between the ring 295 and the ring 296 provision is made of a spring 297. To the arm 290 is furthermore connected one end of a cable 298, which is guided through supports 299, secured to the frame, whereas the other end of this cable is secured to an arm 300 of an angle lever 301. The angle lever 301 is pivoted with the aid of a shaft 302 to a support 303, secured to the frame of the tractor. The lever 301 can be fixed with the aid of a clamping bolt 304 on a bracket 305, secured to the frame. To one end of the shaft 288 is furthermore secured an arm 306, which bears on a stop 307, in the position shown in the figure. The stop 307 is secured to a regulator rod 308 of a regulator 309 shown diagrammatically in the figure. The regulator rod 308 is provided with a ring 310 and is surrounded by a spring 311, which is enclosed between the ring 310 and the housing of the regulator 309. The regulator 309 is coupled in a known manner with the engine for regulating the speed of revolution of the engine. An arm 312 bears on the stop 307 and is secured to a shaft 313. The shaft 313 is journalled in a bearing 314, secured to the frame. The arm 312 is pivoted by means of a rod 315 to a lever 316, which is hinged to the frame with the aid of a shaft 318, journalled in bearings 317. As seen in FIGURE 15, the position of stop 307 is such that the engine runs idling.

The rod 227 is furthermore connected with a valve 318A, which is provided between the ducts of the transmission system, connecting the engine with the pump (see FIG. 18).

From FIG. 15 it will furthermore be seen that the lever 219 is taken through a slot 320, provided in a plate 319 and extending at right angles to the center line of the shaft 222. The plate 319 has furthermore a slot 321, at right angles to the slot 320 and being in open communication with the latter. The mechanism described above operates as follows.

The speed of revolution of the engine can be normally adjusted in operation with the aid of the angle lever 301. When this angle lever is turned counterclockwise, the arm or control member 290 tends to turn about the shaft 288. The arm 290, however, is coupled with the rod 292 by means of the spring 297 and the rod 292 with the arm 287, secured to the shaft 288. When the arm 290 is turned clockwise, the shaft 287 will therefore also be turned clockwise. Thus, with the aid of the arm 306 the regulator rod, secured to the stop 307, is pushed away in the direction of the arrow A1. The regulator 309 is connected with the engine so that a larger quantity of fuel is fed to the engine with this movement of the regulator rod, so that the engine gains speed. When the adjusting member or control-lever 219 is turned out of the central position shown in the figure into slot 321, the rod 288 and arm 306 are rotated counterclockwise and stop 307 is again permitted to return to idling position, the tractor will ride as stated above. The speed of the tractor is controllable both by a turn of the lever 301 and by a turn of the lever 219. If the tractor is to be stopped, the lever 219 is turned again into the central position shown in FIG. 15. With the transmission system described above, it may occur, however, that, for instance owing to small deviations in the transmission mechanism between the lever 219 and the transmission system, the control-member does not accurately occupy the central position, so that the tractor will ride very slowly. In the embodiment shown the lever 219 can be turned about the shaft 220 in the direction of the arrow B1, i.e. in a direction which is at an angle to the direction in which the control-member 219 is displaced by the adjustment of the gear change. The gliding member 225 thus comes into contact with the slanting side 231 of the cam 229, which is thus urged downwards. Since the cam is connected via the rod 227 with the valve 318A, this valve will be turned so that the ducts between the engine and the pump of the gear change are short-circuit with each other, so that no compressed fluid can be displaced from the engine to the pump and the rear wheels of the tractor are not driven.

The cam 229 is furthermore connected with the valve 235. When the cam is urged downwards, the pistons 238 and 239 are displaced, so that the piston 238 arrives between the points where the ducts 241 and 242 communicate with the valve box. The communication between these two ducts is thus interrupted. At the same time, however, an open communication is established between the ducts 242 and 243. Then the fluid can flow away through the ducts 242 and 243 out of the valve box 244, so that the brake strap occupies the position shown in the figure and the brake drum is braked in its rotation. The brake drum is connected with the wheels of the tractor so that these wheels are braked. It will be obvious that the braking mechanism is shown only diagrammatically. The brake drum 252 can be mounted on a shaft connected with one of the tractor wheels, while, as an alternative, the lever 248 can be connected in known manner with the conventional braking mechanism of the tractor wheels.

In normal operation the ducts 241 and 242 are in open communication with each other, so that compressed fluid is fed to the valve box 244 and the piston 245 is pushed upwards, so that the braking mechanism is disengaged and the brake drum 252 is freely rotatable.

When the lever 219 is turned further in the direction of the arrow B1 about the shaft 220, also the cam 230 is urged downwards. Thus the rod 228 comes into contact with arm 276 and the angle lever 277 turns in the direction of the arrow C1, while the rod 284 is displaced in the direction of the arrow D1. The rod 284 thus comes into contact with the arm 287 and the shaft 288 is turned, so that the arm 306 arrives in the position shown in FIG. 15. The control-rod of the regulator 309 is then shifted backwards by the spring 311 into the position shown in FIG. 15, so that the speed of revolution of the engine drops to the stationary speed. The arm 290, coupled with the lever 301, can remain in the turned position, since the spring 297 is compressed and the rod 292 shifts in the slot provided in the arm 290. If it is desired to employ the tractor again, the lever 219 is turned until it is located in the slot 320, while the cams 229 and 230 are moved back under the action of the springs 233 into the positions shown in FIG. 15. The further parts of the mechanism thus regain their initial positions, so that the engine again rotates at the adjusted speed, while at the same time the brake is disengaged and the stop valve is closed again.

In order to employ the engine also for driving a power-take-off shaft, for example, while the tractor stands still, the lever 316 is provided. When this lever is turned in the direction of the arrow E1, the arm 312 will displace the regulator rod 308 so that with the aid of the lever 316 the speed of the engine can also be varied.

The lever 262 is provided in order to permit of putting the brake out of operation, when the engine does not rotate, so that there is no compressed fluid available for urging the piston 245 upwards (FIG. 16). When the lever 262 is turned in the direction of the arrow F1, the ring 259 comes into contact with the lever 248, which is thus moved upwards, so that the brake strap is disengaged. It will be obvious that the lever 219 may also be made from two portions, as is described above for the lever 113.

FIG. 19 shows an arrangement which may be employed for radio remote control of the tractor described above in operation condition.

From the figure it will be seen that a lever 322 is hinged to a support 324, secured to the frame, with the aid of a shaft 323. To the lever 322 are pivoted two parallel plates 325, lying each on one side of this lever, with the aid of a pin 326. Between the two plates 325 provision is made of a block 327, which is hinged to the plates with the aid of pins 328, which extend parallel to the pin 326. The block 327 is provided with a tapped hole. An electric motor 329, provided on the frame, comprises a shaft 330, one end 331 of which is also provided with screw thread and is screwed into the tapped hole of the block 327. The lever 322 represents one of the levers used in that tractor described above, for example the lever by means of which the transmission system is controlled or the lever with the aid of which the tractor is steered or the lever by means of which the speed of revolution of the engine is adjusted. By causing the electric motor 329 to rotate by radio remote control, the lever will turn, depending upon the direction of rotation of the motor, either in the direction of the arrow G1 or in the direction of the arrow H1 about the shaft 323 with respect to the frame.

If the three aforesaid levers are each coupled with an electric motor, it is possible to act radiographically upon the speed of revolution of the engine, the transmission ratio of the transmission system and the position of the steering mechanism, so that the tractor can be remote-controlled. Since the various members for controlling the speed and the steering can be actuated by means of levers, the system required for radiographic control is very simple.

With the tractor described above, in which the steerable running wheel 3, viewed in the travelling direction, is located midway between the driven wheels 1 and 2, provision is preferably made of a differential lock in the differential gear coupling the two driven rear wheels with each other. This is advantageous inter alia when one of the two driven wheels rides on a lower level of the field than the other, for example, in plowing, in which case one of the driven wheels 1 or 2 can ride in a furrow. If the two wheels are not rigidly connected with each other, it is usually required to constantly correct the steering in order to cause the tractor to ride parallel to its longitudinal direction.

This is usually not necessary, when the two wheels are rigidly connected with each other by blocking the differential gear with the aid of the differential lock.

What we claim is:

1. In a vehicle comprising a frame supported by wheels, an engine, an engine speed regulator, a hydraulic transmission system having a variable ratio control, said transmission connecting said engine to at least one driven wheel, the combination of an adjusting member being connected to said ratio control and said regulator, said member being movable in a first direction from a central position to actuate said control and vary the ratio of said transmission and movable from said central position in a second direction to actuate said regulator and vary the speed of said engine, said second direction extending at an angle with respect to said first direction.

2. The invention of claim 1 wherein said adjusting member is a lever and said lever is connected to said regulator through displaceable cam means.

3. The invention of claim 2 wherein said cam means is provided with sloping edges for operative association with one end of said lever.

4. The invention of claim 3 wherein said cam means comprises a pair of spring-urged cams, the first of said cams being connected to said regulator, the second cam means being connected to braking means for braking the wheels of the vehicle.

5. The invention of claim 4 wherein one of said cams is provided with edges that slope steeper than the other cam whereby said adjusting member is initially operatively associated with one cam only.

6. The invention of claim 1 wherein the vehicle has braking means and the adjusting member is connected to the braking means.

7. The invention of claim 6 wherein the braking means includes an arm, said arm being hydraulically actuated to release the brake.

8. The invention of claim 7 wherein manual means are provided to actuate said arm and release the brake.

9. The invention of claim 7 wherein a spring is secured to the arm, said spring being positioned to urge the brake in engagement.

10. The invention of claim 9 wherein the adjusting member is connected to said arm through a hydraulic valve whereby displacing said adjusting member opens said valve and permits said brake to be urged by said spring in engagement.

11. In a vehicle comprising a frame supported by wheels, an engine, an engine speed regulator, a hydraulic transmission system having a variable ratio control, said transmission connecting said engine to at least one driven wheel, the combination of an adjusting member connected to said ratio control through a shaft element, said member being movable in a first direction from a central position to turn said element and to actuate said control and vary the ratio of said transmission and movable from said central position in a second direction to pivot about said element and actuate said regulator and vary the speed of said engine, said second direction extending at an angle with respect to said first direction.

12. The invention of claim 11 wherein said regulator is connected to said adjusting member through a spring-urged mechanism mounted on a shaft.

13. The invention of claim 12 wherein an arm is secured to said shaft, said arm being adapted to bear on a regulator.

14. The invention of claim 13 wherein independent control means is provided to bear on said regulator, said control means being attached to the frame.

15. The invention of claim 13 wherein said regulator is provided with a spring-biased rod that cooperates with said arm.

16. The invention of claim 13 wherein said mechanism includes a second arm rotatably mounted on said shaft, said second arm being associated with a third arm rigidly secured to said shaft.

17. The invention of claim 16 wherein said second and third arms are coupled by means of a spring-urged rod, said rod being affixed to said third arm and movably mounted on said second arm.

18. The invention of claim 17 wherein independent tension means is provided for rotating said second arm about said shaft, said independent means being secured to the frame.

19. The invention of claim 17 wherein said third arm is acted on by said adjusting means through a pivoted shaft.

20. In a vehicle comprising a frame supported by wheels, an engine, an engine speed regulator, a hydraulic system having a variable ratio control, said transmission connecting said engine to at least one driven wheel, said system having high-pressure fluid from the engine driven part towards the wheel-coupled part and low pressure fluid from the wheel-coupled part to the engine-driven part, the combination of an adjusting member being connected to said ratio control and said regulator, said member being movable in a first direction from a central position to actuate said control and vary the ratio of said transmission and movable from said central position in a second direction to actuate said regulator and vary the speed of said engine, said second direction extending at an angle with respect to said first direction.

21. The invention of claim 20 wherein a valve mechanism for short circuiting said high and low pressure parts of the transmission is actuated by the adjusting means when the latter is displaced in the second direction.

22. The invention of claim 21 wherein the vehicle includes braking means and the adjusting member is connected to said regulator and braking means through displaceable cams.

23. The invention of claim 22 wherein a first cam is normally displaceable before the other, said first cam actuating the short circuiting mechanism and braking means before regulating the speed of the engine.

(References on following page)

References Cited by the Examiner

UNITED STATES PATENTS

| | | | |
|---|---|---|---|
| 1,428,907 | 9/1922 | Reigh | 180—27 |
| 1,748,401 | 2/1930 | Backhus | 180—77 |
| 1,773,587 | 8/1930 | Lape | 180—66 |
| 1,928,915 | 10/1933 | Stout | 180—77 |
| 2,015,911 | 10/1935 | Schroeder | 180—27 |
| 2,086,889 | 7/1937 | Anderson | 180—66 |
| 2,349,265 | 5/1944 | Hamren | 180—66 |
| 2,393,882 | 1/1964 | Blair | 180—66 X |
| 2,507,000 | 5/1950 | Farmer | 280—87 |
| 2,559,379 | 7/1951 | Szekely | 280—87 |
| 2,651,377 | 9/1953 | Lapsley | 180—6.3 |
| 2,704,131 | 3/1955 | Vahs | 180—66 |
| 2,774,434 | 12/1956 | Ferris | 180—6.3 |
| 3,022,850 | 2/1962 | Bidwell et al. | 180—77 |
| 3,078,656 | 2/1963 | Jedrzykowski | 180—66 |
| 3,132,486 | 5/1964 | Jonkers et al. | 180—6.3 |

BENJAMIN HERSH, *Primary Examiner.*

A. HARRY LEVY, *Examiner.*